Sept. 29, 1931. W. M. BARRET 1,825,172
BALANCE INDICATOR
Filed Dec. 13, 1929 2 Sheets-Sheet 1

Inventor
William M. Barret

By Clarence A. O'Brien
Attorney

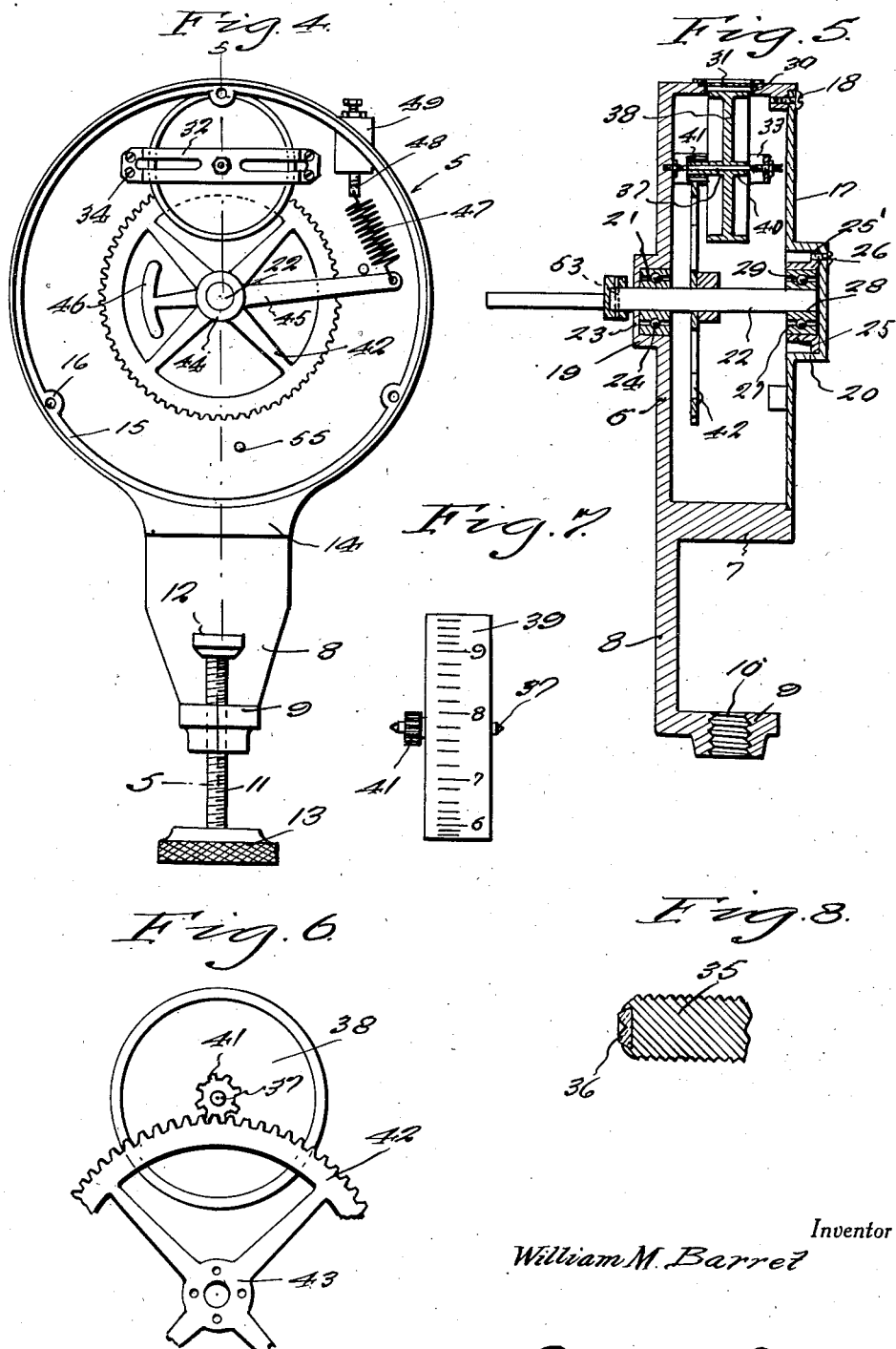

Patented Sept. 29, 1931

1,825,172

UNITED STATES PATENT OFFICE

WILLIAM M. BARRET, OF SHREVEPORT, LOUISIANA

BALANCE INDICATOR

Application filed December 13, 1929. Serial No. 413,827.

This invention relates broadly to devices for depicting balance, the primary object of this invention being the provision of a device for determining the static balance of golf clubs, tennis rackets, base ball bats, and other such articles as may be appropriate of being measured for determining the balance of the article.

It is a well known fact, that the weight alone does not furnish a true index to the inherent "feel" of either the golf club, the tennis racket, the base ball bat or the like, but rather the correct balance is determined by both the gross weight and the position of the center of gravity.

For example, we may have a racket which is relatively light in actual weight, but which, by virtue of the concentration of this mass in the head or spanning portion of the racket, will tend to produce an abnormally heavy balance.

It is therefore a very important object of this invention to provide an indicating device for accurately determining the torque or turning moment exerted by the athletic implement in appropriate units, which determination will furnish an accurate criterion of their inherent playing qualities.

A still further object of the invention is to provide a device of this character which is comparatively simple in construction, consisting of but relatively few parts, and which will be found thoroughly reliable, comfortable and efficient in operation, and otherwise well adapted for the purpose designed.

Other objects and advantages of the invention will become apparent during a study of the following description, taken in connection with the accompanying drawings, wherein:—

Fig. 4 is a side elevational view of the indicator, with the cover plate of the casing removed.

Fig. 5 is a longitudinal vertical sectional view taken therethrough.

Fig. 6 is an elevational view of a scale wheel forming part of this invention.

Fig. 7 is a fragmentary detail view for more fully illustrating the operating connections between the main shaft and the scale wheel.

Fig. 8 is a fragmentary detail sectional view through one of the jewelled bearings.

Figure 1:
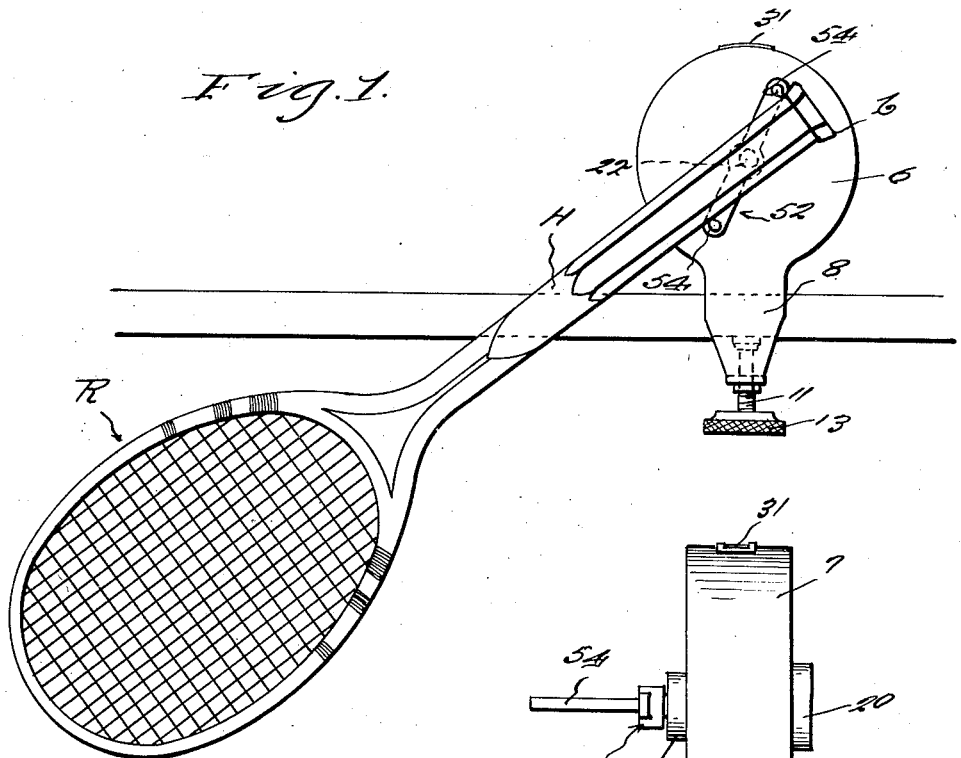
Figure 1 is a side elevation of a balance indicator embodying the features of this invention, the same being shown in operation.
Figure 2:
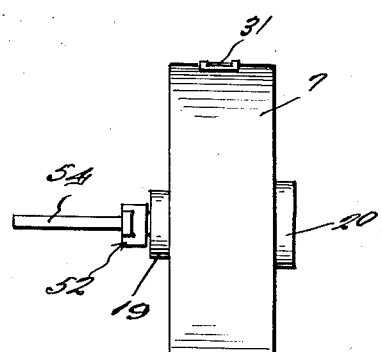
Fig. 2 is an edge elevation of the indicator.

With reference more in detail to the drawings, it will be seen that my balance indicator comprises a casting embodying a substantially circular casing 5, which casing 5 includes an end wall 6, a peripheral wall 7, the casing being open at its other end so that access may be had to the interior of the casing when desired.

Depending from the bottom of the casing in vertical alinement with the end wall thereof, is a bracket extension 8, which extension 8 terminates at the lower end thereof in an inwardly directed lower lug 9, said lug 9 extending inwardly beneath the bottom casing and in spaced relation thereto. The leg 9 is provided with an internally threaded aperture 10.

An elongated threaded clamping bolt 11 is threaded through the opposite end for movement toward or away from the bottom of the casing, and this bolt 11 at its upper end has a gripping head 12 mounted thereon, said gripping head 12 being connected to the end of the clamping bolt 11, preferably through the medium of a ball and socket connection. At its lower end, the clamping bolt 11 is provided with a knurled actuating knob 13.

The bottom of the casing directly above the lug 9 is thickened externally for reinforcing as at 14, which reinforced portion 14 forms a supporting base for the bottom of the casing and cooperates with the head 12 of the clamping bolts 11 for clamping the device to the edge of a work table in an obvious manner, and as clearly suggested in Fig. 1.

The open end of the casing, the peripheral wall of the casing, is provided with an annular shoulder 15, and at spaced points thereon, the shoulder is provided with inwardly directed radial lugs 16. These lugs are internally threaded. A disk-like cover plate 17 is within the confines of the peripheral walls in abutting relation to said annular shoulder. Securing bolts 18 are passed through suitable apertures provided therefor in the cover plate for threaded engagement with the lugs 16 for retaining the cover plate in position.

The end wall 6 has formed integrally therewith and pressed outwardly therefrom, a centrally located bearing pocket 19. Similarly, the cover plate 17 has formed integrally therewith, and pressed outwardly therefrom, a centrally located bearing pocket 20, which bearing pocket 20 is also relatively of greater diameter than the bearing pocket 19, and is in transverse alinement with said bearing pocket 19.

Pressed within the confines of the bearing pocket 19 is an outer ball race 21. A freely rotatable shaft 22 has one end thereof extending thru the bearing pocket 19, and this end of the shaft has pressed thereon an inner bearing race 23, ball bearings 24 being disposed between the said inner and outer bearing races completing a suitable bearing structure for this end of the shaft.

An annulus sleeve-like member 25 is arranged within the bearing pocket 20, and at one end thereof, the annular member 25 is provided with an outstanding annular attaching flange 25′ bolted or otherwise secured as at 26 to the end or closing wall of the said pocket 20. Carried by, and interiorly arranged within the annular member 25 is an outer bearing race 27 cooperating with an inner bearing race 28 formed on the end of the shaft 22, extending into said pocket 20, for retaining between said inner and outer bearing races, ball bearings 29.

Bearings of the characters and structure just described are thought to be best suited for relieving friction and rendering the reading more exact, and for this reason such types of bearing structure are preferred, although as is apparent, other suitable bearing structures, may be substituted therefor.

As will also be appreciated, this type of bearing structure as described in detail with regard to the cover plate 17, will facilitate the removal of the plate whereby access may be readily obtained to the interior of the casing.

On the top of the casing, the peripheral wall thereof is provided with a sight opening 30, having a suitable clamp housing 31 mounted therein. A horizontally disposed U-shaped bracket 32 has the legs 33 thereof secured at their free ends as at 34 to the upper portion of the end walls 6 of the casing directly to the said bight openings.

Transversely alined studs 35 are threaded in the said end wall 6 and an intermediate portion of the bight of the U-shaped bracket 32, and on the inner opposed ends of the studs 35 are jewelled bearings 36. A shaft 37 has the pointed end thereof receiving in the jewels 36, and mounted on the shaft is a scale wheel or drum 38, which drum 38 on the peripheral face thereof, is formed in any suitable manner with a scale 39, which scale 39 is so calibrated, that its graduations indicate directly the torque exerted in convenient units.

The hub 40 of the scale drum is provided with a spur gear 41 in mesh with a relatively large gear wheel 42 mounted on the main balance shaft 22. The hub 43 is suitably perforated for the reception of bolts or other suitable elements not shown, for securing the hub to the boss 44 of a balance arm 45, fixed to the shaft 22.

The balance arm 45 is weighted as at 46 at one end thereof, and has its free end secured to one end of a coiled spring 47, which coiled spring 47 has its other end secured to the lowermost end of an adjusting bolt 48 threaded through a stationary block 49 formed integral with the peripheral wall 7 of the casing, and arranged thereon to one side of the scale drum 38, as shown to advantage in Fig. 4.

The extended end of the balance shaft 22 is receivable in a hub 50 formed intermediate the ends of the bight or crown portion 51 of a substantially U-shaped torsion-head designated generally by the reference character 52. The said end of the shaft 22 is retained within the hub 50 through the medium of a retaining pin 53 or in any other suitable manner.

The torsion-head 52 further comprises the spaced parallel co-extensive arms 54, which arms 54 are adapted to engage the implements or device whose balance is to be determined through the medium of this balance indicator.

In Fig. 1, I have shown the device as being used for determining the static balance of a tennis racket, such illustration being merely for the purpose of exemplification, since in actual practice it is to be understood that the device is capable of determining the balance of other athletic implements or devices, than a tennis racket, as for example, base ball bats, golf clubs, fishing poles, and all other implements or devices of which balance is an essential and necessary quality of the implement or device.

Thus, as shown in this aforementioned figure, the handle H, of the tennis racket R, has the free end thereof extended between the arms 54—54 of the torsion-head, one arm engaging the leather butt $b$ at the end of the handle, and the other arm of the torsion-head engaging an intermediate portion of the handle, at a side opposite to the first-mentioned arm of the 54.

Manifestly, the weight of the working head of the tennis racket will overcome the action of the spring 47, thus rotating the head 52, and consequently through the medium of the gear wheel 42, meshing with the pinion 41, rotation will be imparted to the scale 38, and thru the medium of the suitably calibrated scale 39, the torque exerted will be indicated and readily observable through the sight opening in the top of the casing.

In actual practice, the torsion-head 52 will be so constructed that the size of the racket or club handle is immaterial, since in every case the center line of the handle will pass directly over the center of the instrument or balance shaft 22.

From the foregoing then, it will be seen that the racket or other implement is suitably supported within the torsion-head 52, and allowed to turn to its position of equilibrium. The resultant torque or turning moment being then indicated by the scale, so that the correct balance of the implement is readily and easily ascertainable, through the instrumentality of a device of this character.

To limit the swinging of the balance arm 45, and enhance the rotation of the shaft 22, there is extended inwardly from the end walls 6 of the casing, a pair of spaced stops 55 between which the spring controlled end of the balance arm 45 will swing, and against which the balance arm will abut, to limit the swinging movement thereof.

Even though I have herein shown and described the invention, as consisting of certain detail structural elements, it is to be understood that I do not wish to limit myself to the precise details of construction, but rather that the device is susceptible to certain changes in the refinements and variations, as coming within the scope of the claims, hereunto appended, the spirit of the invention as herein described.

Figure 3:
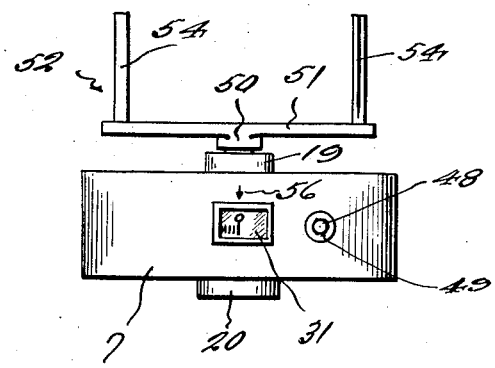
Fig. 3 is a top plan view thereof.

However, in the embodiment of this invention herein illustrated, the pointer is fixed with reference to the rotating scale drum, this pointer being indicated by the reference character 56, and is painted or otherwise formed on the outer face of the peripheral walls of the casing, in suitable relation to the type formed in the said wall, and as is shown to advantage in Fig. 3.

Having thus described my invention, what I claim as new is:—

1. A device for determining the balance of suitable articles, said device comprising a rotatably mounted shaft, means for rotatably mounting the shaft, a torsion-head carried by said shaft at one end of said shaft for accommodating one end portion of a suitable article whose balance is to be determined, said torsion-head adapted to retain said article in relation to the shaft so that the center line of the article will pass directly over the center of the shaft, and whereby the free end of the article will be so supported as to be free to assume its position of equilibrium, an indicating scale, means for controlling the rotation of said shaft, and an operating connection between said shaft and said indicating scale, whereby the static balance of the article will be registered on said scale.

2. In a balance indicator, a casing, a clamping element carried by the casing for securing the casing in a clamped vertical position upon a suitable support, a shaft rotatably supported in said casing and extending through said casing, an article retaining torsion-head mounted on the extended end of said shaft, said head adapted to accomodate one end of an article for retaining said article in such a position that the longitudinal center line of the article will pass directly over the center of said shaft, and whereby said article will be free to turn to its position of equilibrium, thus imparting a rotative movement to said shaft, a torque indicating scale, and an operating connection between said scale and said shaft whereby the resultant torque or turning moment may be ascertained.

3. In a balance indicator, a casing, a clamping element carried by the casing for securing the casing in a clamped vertical position upon a suitable support, a shaft rotatably supported in said casing and extending through said casing, an article retaining torsion-head mounted on the extended end of said shaft, said head adapted to accommodate one end of an article for retaining said article in such a position that the longitudinal center line of the article will pass directly over the center of said shaft, whereby said article will be free to turn to its position of equilibrium, thus imparting a rotative movement to said shaft, a torque indicating scale, an operating connection between said scale and said shaft whereby the resultant torque or turning moment may be ascertained, a balance arm on said shaft interiorly of said casing, and spring means operatively associated with one end of the balance arm for normally urging said balance arm in one direction, against the action of the article carried by said torsion-head.

4. In a balance indicator, a casing, a clamping element carried by the casing for securing the casing in a clamped vertical position upon a suitable support, a shaft rotatably supported in said casing and extending through said casing, an article retaining torsion-head mounted on the extended end of said shaft, said head adapted to accommodate one end of an article for retaining said article in such a position that the longitudinal center line of the article will pass directly over the center of said shaft, whereby said article will be free to turn to its position of equilibrium, thus imparting a rotative movement to said shaft, a torque indicating scale, an operating connection between said scale and said shaft whereby the resultant torque or turning moment may be ascertained, a balance arm on said shaft interiorly of said casing, and spring means operatively associated with one end of the balance arm for normally urging said balance arm in one direction against the action of the article carried by said torsion-head, adjusting means embodied in said spring means, and an indicating pointer operatively associated with said scale.

5. In a balance indicator, a rotatably mounted shaft, means on one end of the shaft for accommodating one end of an article for retaining said article in such a position that the longitudinal center line of the article will pass directly over the center of the shaft, whereby said article will be free to turn to its position of equilibrium thus imparting a rotative movement to said shaft, a torque indicating scale, and having an operating connection with said shaft whereby the resultant torque or turning movement may be registered on said scale, for indicating the static balance of the article and an adjustable tensioning device acting on said shaft oppositely to said article.

In testimony whereof I affix my signature.

WILLIAM M. BARRET.